(12) United States Patent
Sargent et al.

(10) Patent No.: US 6,580,956 B1
(45) Date of Patent: Jun. 17, 2003

(54) POSITIONING SYSTEM

(75) Inventors: Leigh R. Sargent, Plainfield, IN (US); Phillip J. Gordon, Carmel, IN (US)

(73) Assignee: Applied Composites Engineering, Inc., Indianapolis, IN (US)

( * ) Notice: Subject to any disclaimer, the term of this patent is extended or adjusted under 35 U.S.C. 154(b) by 0 days.

(21) Appl. No.: 09/494,074

(22) Filed: Jan. 28, 2000

Related U.S. Application Data

(60) Provisional application No. 60/117,851, filed on Jan. 29, 1999.

(51) Int. Cl.$^7$ .............................................. G06F 19/00
(52) U.S. Cl. .......................... 700/114; 700/57; 700/192
(58) Field of Search ....................... 700/186, 56, 59–62, 700/66, 114, 175, 192, 172, 57; 29/559, 281.1, 281.4; 414/754, 780, 781; 269/303–305, 315, 320

(56) References Cited

U.S. PATENT DOCUMENTS

| | | | |
|---|---|---|---|
| 4,321,679 A | * 3/1982 | Fujie et al. | 700/192 |
| 5,630,269 A | * 5/1997 | Wasserbaech et al. | 29/559 |
| 6,141,600 A | * 10/2000 | Nishijima | 700/114 |

* cited by examiner

*Primary Examiner*—Leo Picard
*Assistant Examiner*—Steven R. Garland
(74) *Attorney, Agent, or Firm*—E. Victor Indiano; Indiano, Vaughan & Roberts, P.A.

(57) ABSTRACT

A method and apparatus for positioning a workpiece in a desired position on a gauge fixture. The apparatus includes a gauge fixture, a positioner assembly, a pusher assembly and a controller. The fixture has a first side and a second side, the first side being opposite the second side. The positioner assembly is mounted on the first side of the gauge fixture, and includes a stop member, a crank and a positioner sensor. The pusher assembly is mounted on the second side of the gauge fixture, and includes a pusher member and a pusher sensor. The controller is connected to the pusher assembly and the positioner assembly. During positioning, the pusher member of the pusher assembly pushes the workpiece until it reaches the stop member of the positioner assembly; the controller actuates the positioner sensor and the pusher sensor to sense the position of the workpiece on the gauge fixture and the controller actuates the crank of the positioner assembly to move the workpiece until the positioner sensor and the pusher sensor indicate that the workpiece is in the desired position. The positioner and pusher sensors are preferably removable and replaceable, such that when they are mounted they are located at known positions relative to a reference position of the gauge fixture. The workpiece may be placed against the stop of the positioner assembly initially, in which case the pusher member of the pusher assembly may be omitted.

19 Claims, 4 Drawing Sheets

FIG. 2a
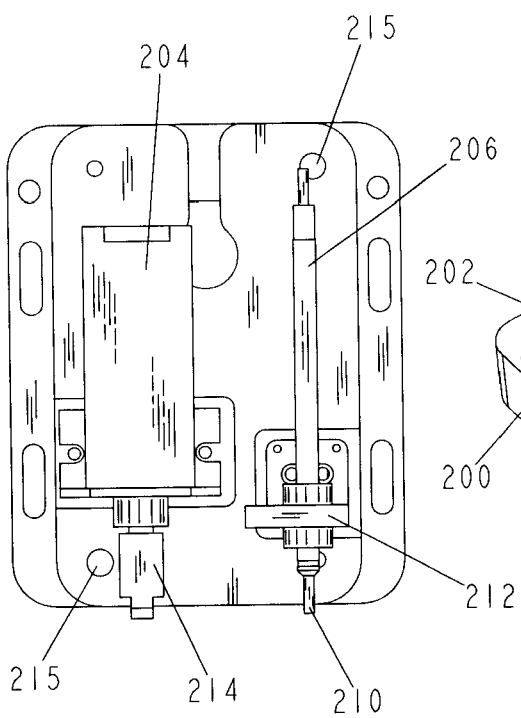
FIG. 2d
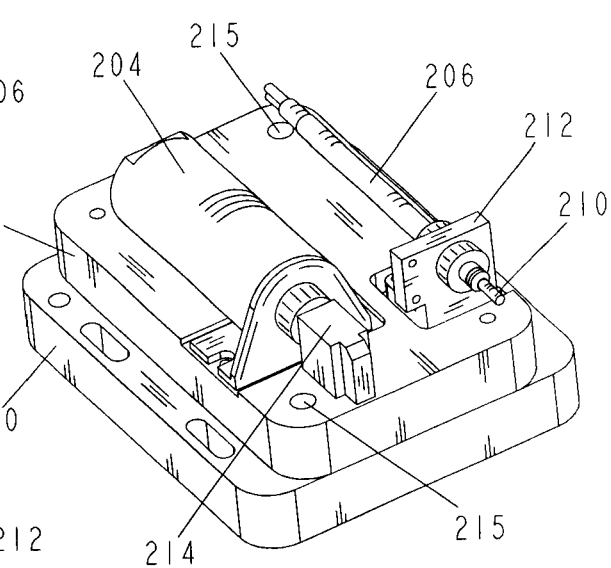
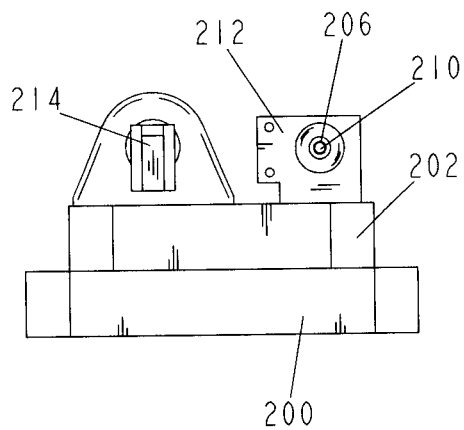
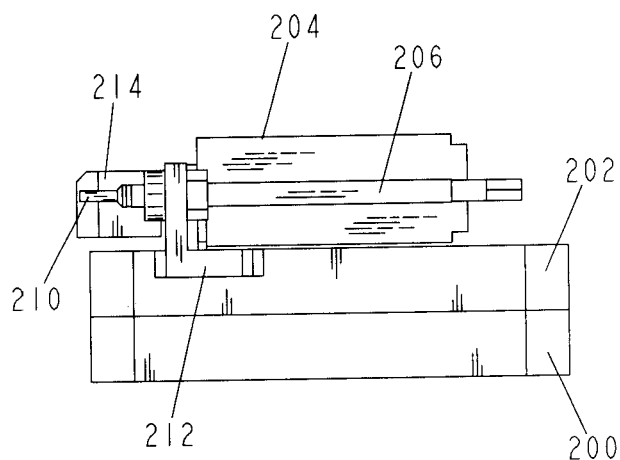
FIG. 2b
FIG. 2c

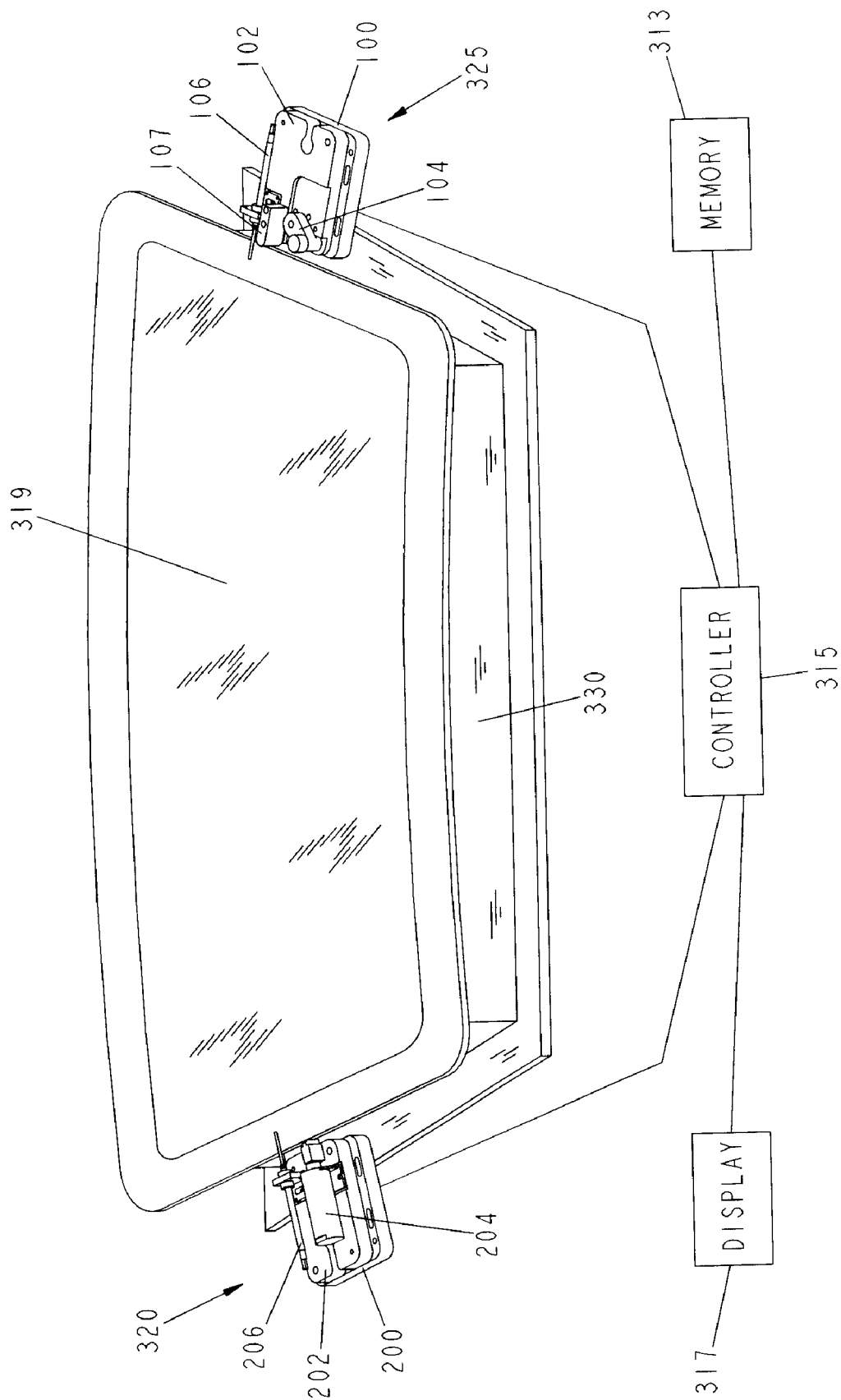

POSITIONING SYSTEM

This application claims benefit to Sargent and Gordon U.S. Provisional Patent Application No. 60/117,851 filed Jan. 29, 1999.

FIELD OF THE INVENTION

The present invention relates to an automatic positioning device mounted on testing equipment or associated tooling devices. In particular, a positioning device is mounted on a gauge fixture or test equipment, the positioning device consisting of two electro-mechanical devices and a controller. The positioning device automatically positions parts to be checked or tested to a high degree of accuracy and repeatability.

BACKGROUND OF THE INVENTION

The use of positioning devices with equipment, tooling, gauging fixtures and the like for dimensional checking of such parts as automotive glass and sheet metal have been very rudimentary. Predominantly this has been done by hand, where the operator of the gauge fixture will position the part to be checked by line of sight to a scribed line or by feel from his finger tips to a perimeter edge or surface on a gauge fixture. This is very subjective and allows for a tremendous variable in the measurements being taken. A second level of positioning by the operator is to pull or push the part against perimeter stops, this is also subjective, as the operator is unable to assure that the part is in contact with the stops on every part being measured, again measurement data contains large variables. As described in the next paragraph, positioning to a perimeter datum stop also inhibits the full use of the tolerances allowable on the part. A third operator positioning system, made by LMI, provides a visual feed back by way of a needle gauge that the operator reads. This device is simply a differential volt meter utilizing two linear displacement sensors. The LMI system has the fundamental draw back of not being able to be zeroed, that is a reference position is unable to be accurately obtained. The system still relies on the operator to feel the part into position whilst looking at the needle which once again introduces operator variables. The system also does not have the ability to show, or data log how accurately the part is positioned, thus still providing variable positioning and unreliable data collection.

To eliminate operator input, several devices have been used that include pushers that push the part against stops. This particular system when properly executed can provide a consistent positioning of the part, but has the draw back of compromising the perimeter tolerance. This compromise is due to the positioning of the datum stop, which can be at minimum, nominal or maximum size, thus tolerance on the edge of the part placed against the datum, is not being utilized and is accentuated on the opposing side of the part. A second mechanical system is linear actuators, such as air cylinders, that come to a positioning stop at a point near the proposed edge of a perfect part. This positioning system falters because the final positioning of the moveable datum stops can be no closer than what the largest part size would be. Those parts made to less than the largest tolerance size are able to float in position which allows variability in measurements. If the part to be measured is out of tolerance, being too large, the actuated datums will not come to their final position but, will be stopped by the edge of the part. Thus, the location of the part to be measured will be offset from it's nominal or proposed position on the gauge.

Therefore, a need exists for a system that: (1) automatically positions the part without introducing operator variables; (2) accurately positions the part taking into account part intolerance; (3) achieves high accuracy and repeatability of positioning irrelevant to part size variability; (4) feeds back to the operator or data log the positioning accuracy of the part; (5) self checks if the part is positioned correctly; and (6) if the part is not positioned correctly, automatically repositions or rejects the part from measurement.

Specifically, the automotive glass industry has desired the ability to accurately and repeatedly position windshields and back glass centrally from side to side on gauge fixtures for the purpose of measuring, irrespective of part size accuracy or part to part consistency. This challenge has yet to be met with any degree of accuracy or consistency. One objective of the present invention is to provide such a device.

SUMMARY OF THE INVENTION

In accordance with the present invention, an automatic positioning device is disclosed that permits the part being measured to be located accurately, taking into consideration part intolerance, and variability from part to part. This device is also able to automatically check if the part is accurately positioned and either repositions the part if not positioned correctly, or rejects the part from further measurement. This device will also allow a measurement to be taken for operator view or data logging on the accuracy to which the glass has been positioned.

Preferably, electro-mechanical devices in conjunction with a micro-controller and sensors are utilized in a closed loop feed back system to move and dynamically measure the position of the part on the gauge fixture. This allows accurate positioning of the part on the gauge, averaging the intolerance of the part size. The invention includes at least two mechanical devices, a pusher assembly and a positioner assembly which physically move and position the part, and an electronics system which holds the programming that controls the actuation of the pusher assembly and the positioner assembly in positioning of the final part.

The two mechanical devices usually are in a position opposed to each other on the gauge. The first mechanical device, called the pusher, consists of a base plate, air cylinder/pusher and a linear sensor. The second mechanical device, called the positioner consists of a base plate, motor plate, electrical motor, crank, linear sensor and stop. These two devices physically move the part into its centralized or desired position by two separate movements. The pusher assembly initially pushes the part using the air cylinder or similar mechanical means, to the stop on the positioner assembly. This assures that the part is biased toward the positioner assembly, as the stopper is placed outside the maximum part size. Once the pusher has biased the part toward the positioner, the sensors, one on each device, actuate out to sense the offset of the part, which is now biased toward the positioner. The positioner assembly now moves the part in a controlled fashion using the motor and crank back toward the pusher side until the required position is attained. The positioner's motor and crank could also be a linear ball screw with motor, linear motor or similar actuation device controllable from a micro-controller or similar device.

The electronics system typically is comprised of a micro-controller and motor controller. The micro-controller could also be a computer, PLC or similar device. The micro-controller reads the sensors on both the pusher and positioner once in their actuated position. Therefore, the micro-controller knows the position of the part and the size. The micro-controller then provides the correct amount of power and timing through the motor controller to move the crank and therefore the part. When the sensors read equally or at least to a predetermined setting in the micro-controller, the micro-controller stops the motor, places it in reverse and retracts the crank. To assure that the part is still in position, the micro-controller will check the part utilizing the sensor, if the part is correctly placed the micro-controller will inform the operator through visual indications that the part is ready to take measurements or directly inform data acquisition equipment. If the part is not correctly positioned, the micro-controller can attempt to position it again, or reject the part for inspection. As this is a programmable device, the ability to add variables, change sequences or kinematics to suit part size and type is infinitely variable. Note that the crank could be left in the stopped position and not retracted once the part has reached it's final position acting as a contact datum stop. As the measurement through the linear sensors is separate to that of the actuation and movement, this provides a true closed loop feedback system providing high accuracy and repeatability.

Through this use, in the present invention, of a combination of a micro-controller, an electro-mechanical positioner assembly and an electro-mechanical pusher assembly, the positioning system can position or centralize a part to be measured on a gauge fixture in a highly accurate and repeatable fashion. This eliminates operator input, increasing efficiency and accuracy. The accuracy and repeatability of the invention has not been attainable by operators or existing mechanical devices. It has been found that the invention can position within 0.002 inches.

There are other attributes of the above invention to accommodate the end user, for cost saving due to maintenance or exchange of components. The plates on both the pusher assembly and positioner assembly are dual plates, where the upper is doweled to the lower. The position of both the pusher and positioner with respect to the datums of the gauge fixture is highly accurate and attained by positioning the lower plate. To allow for removal and replacement, the upper plate on both the pusher and positioner can be unbolted and accurately replaced. This allows for a modular replacement for maintenance or the removal and use elsewhere of the pusher assembly and positioner assembly if the gauge fixture is temporarily out of service.

As this invention is driven by a micro-controller or equivalent device such as a computer or PLC, feedback to the operator through a visual display can be incorporated, allowing the operator or quality engineers to see the accuracy at which the part is being positioned. The electronics can be connected to other automated devices on the gauging fixture, thus automating the complete cycle of checking as well as automatically logging the positioning data to a data base.

Additional objects, advantages and novel features of the invention are set forth in the description that follows, and will become apparent to those skilled in the art upon reviewing the drawings in connection with the following description.

BRIEF DESCRIPTION OF THE DRAWINGS

FIG. 2a shows a top view of the pusher assembly;

FIG. 2b shows a front view of the pusher assembly;

FIG. 2c shows a side view of the pusher assembly;

FIG. 2d shows a perspective view of the pusher assembly;

FIG. 3 shows a positioning system; and

DESCRIPTION OF THE PREFERRED EMBODIMENTS

Figure 1A:
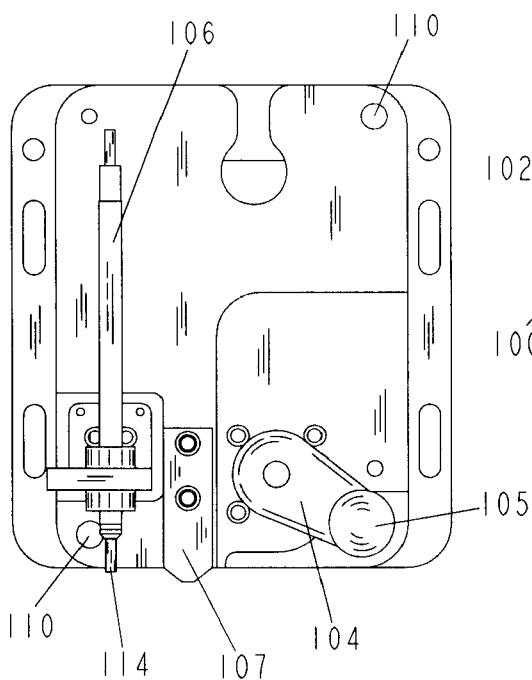
FIG. 1a shows a top view of the positioner assembly.

The positioning system of the present invention as shown in FIG. 3 includes a pusher assembly 320, a positioner assembly 325 and a micro-controller 315 which controls the actuation of the pusher assembly 320 and the positioner assembly 325. The pusher 320 and the positioner 325 are usually mounted on opposite sides of a gauge fixture 330 upon which a part 319 to be positioned will be placed.

Figure 1D:
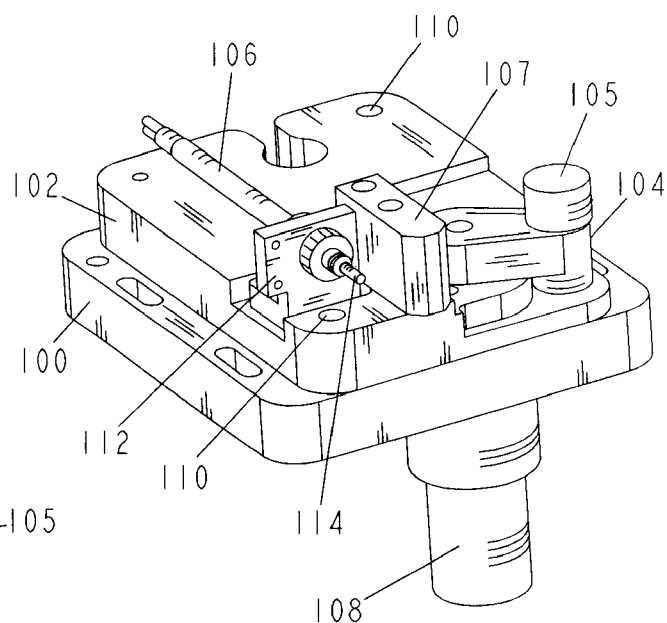
FIG. 1d shows a perspective view of the positioner assembly.
Figure 1B:
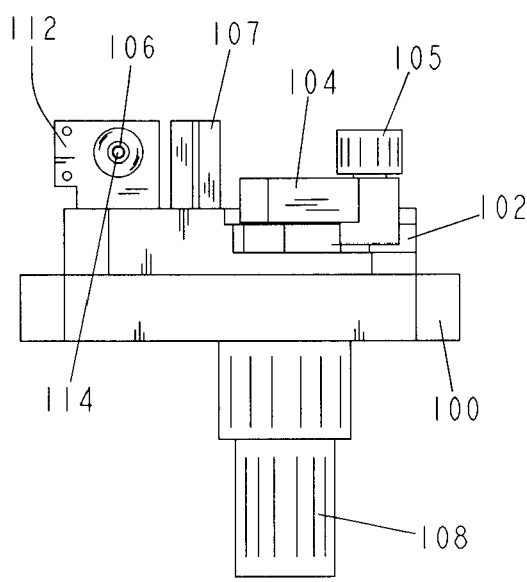
FIG. 1b shows a front view of the positioner assembly.
Figure 1C:
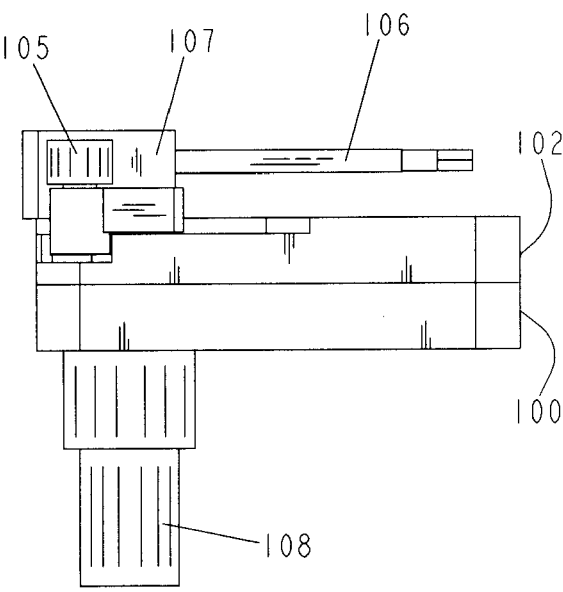
FIG. 1c shows a side view of the positioner assembly.

The positioner assembly 325, shown in greater detail in FIGS. 1a through 1d, includes a base plate 100, an upper plate 102, a motor 108, a crank 104, a linear sensor 106 and a stop 107. FIG. 1a is a top view of the positioner assembly 325 showing the sensor 106, the stop 107 and the crank 104. FIG. 1b is a front view of the positioner assembly 325 showing the upper plate 102, the lower plate 100, the stop 107, the sensor 106, the crank 104 and the motor 108. FIG. 1c is a side view of the positioner assembly 325 showing the upper plate 102, the lower plate 100, the stop 107, the sensor 106, the crank 104 and the motor 108. FIG. 1d is a perspective view of the positioner assembly 325 showing the upper plate 102, the lower plate 100, the stop 107, the sensor 106, the crank 104 and the motor 108.

The linear sensor 106 is held to the upper plate 102 via a bracket 112. The stop 107, typically made of nylon, is bolted to the upper plate 102. It is the outward protruding edge of the stop 107 that stops the part being moved over by the pusher assembly 320.

The crank 104 of the positioner assembly 325 is attached to the motor 108. The motor 108 turns the crank 104 clockwise as seen in FIG. 1a, thus moving the part away from the positioner 325 toward the desired position. The sensor 106 includes a tip 114 which extends to measure the position of the part. The crank 104 has a roller bearing 105 attached to the end. This allows for smooth contact to the part being positioned. The upper plate 102 is positioned on the base plate 100 through the use of dowels 110. This allows for the module of the upper plate 102, the sensor 106, the stop 107, the crank 104 and the roller bearing 105, to be removed as a module and replaced accurately. The lower plate 100 is permanently attached to the gauging fixture 330 once positioned.

The pusher assembly 320, shown in greater detail in FIGS. 2a through 2d, includes a base plate 200, an upper plate 202, an air cylinder/pusher 204 and a linear sensor 206. The air cylinder 204 has a push tip 214, usually made of nylon, that pushes the part against the stop 107 of the positioner 325. FIG. 2a is a top view of the pusher assembly 320 showing the sensor 206 and the air cylinder/pusher 204. FIG. 2b is a front view of the pusher assembly 320 showing the upper plate 202, the lower plate 200, the sensor 206, and the push tip 214 of the push cylinder 204. FIG. 2c is a side view of the pusher assembly 320 showing the sensor 206, the push cylinder 204, the upper plate 202 and the lower plate 200. FIG. 2d is a perspective view of the pusher assembly 320 showing the push cylinder 204, the sensor 206, the upper plate 202 and the lower plate 200.

The sensor 206 is held to the upper plate 202 via a bracket 212. The sensor 206 includes a sensor tip 210 which is extended to measure the position of the part. The upper plate 202 is doweled to the lower plate 200 using two dowels 215. This allows the upper plate 202, push cylinder 204 and sensor 206 to be removed and replaced accurately as a module.

FIG. 3 shows the pusher assembly 320 and the positioner assembly 325 attached to either side of an automotive glass gauging fixture 330. The pusher 320 and the positioner 325 are each connected to the controller 315 which controls the pusher assembly 320 and the positioner assembly 325, and which receives the signals from the pusher sensor 206 and the positioner sensor 106. The workpiece 319 to be positioned is placed onto the face of the fixture 330. The controller 315 is connected to a display 317, which can be an analog or digital display, which an operator can view to see the sensed position of the workpiece 319 on the gauge fixture 330. The controller 315 also includes or is connected to a memory device 313 in which the sensor measurements of the positioner sensor 106, the pusher sensor 206, and other desired information can be stored during the positioning process.

The push cylinder 204 of the pusher assembly 320 extends the push tip 214 and pushes the workpiece 319 across the fixture 330 until the workpiece 319 contacts the stop 107 of the positioner assembly 325. The push cylinder 204 will then retract the push tip 214. In an alternative embodiment, the pusher assembly 320 can not include the push cylinder 204 and the workpiece 319 can be placed on the fixture 330 in a starting position in which it contacts the stop 107.

The pusher sensor 206 and the positioner sensor 106 extend their sensor tips 114, 210, respectively, to touch the perimeter of the workpiece 319 being inspected and determine its position. The crank 104 of the positioner assembly 325 is driven by the motor 108, which is controlled by the micro-controller 315, to push the workpiece 319 back toward the pusher assembly 320 until the workpiece 319 reaches the desired position. If the workpiece 319 is to be centered, the crank 104 will push the workpiece 319 until such time as the sensors 106, 206 read equally showing that the workpiece 319 in this case is centered. The micro-controller 315 will then shut down the motor 108, then reverse the motor 108 to retract the crank 104.

It is typical for sensors in the gauge fixture environment to be calibrated. Calibration references the sensor to the geometric dimensioning of the gauge fixture 330. Thus, measurements taken by the calibrated sensor are related to a reference position on the gauge fixture 330. The pusher sensor 206 and the positioner sensor 106 also need to be calibrated. This can be done by placing a known datum in front of the sensors 106, 206, then extending the sensor tips 114, 210, respectively, and registering a zero set point.

The preferred method of calibrating the sensors 206, 106 is to reference the pusher sensor 206 to the upper plate 202 of the pusher assembly 320 and the positioner sensor 106 to the upper plate 102 of the positioner assembly 325. This is done by referencing each sensor to the upper plate via the sensor body and the holding bracket.

The base plate 200 of the pusher assembly 320 is positioned with respect to a dimensional reference of the gauge fixture 330. The upper plate 202 of the pusher assembly 320 is referenced to the base plate 200 of the pusher assembly 320 with dowels 215. This registration or calibration is both repeatable and accurate. The sensor 206 of the pusher assembly 320 is referenced to the upper plate 202 of the pusher assembly 320 with the holding bracket 212. Knowing the location of the base plate 200 of the pusher assembly 320 relative to a known reference of the gauge fixture 330, having the upper plate 202 doweled to the lower plate 200, and having the sensor 206 calibrated to the upper plate 202, provides the location of the pusher sensor 206 relative to the known reference of the gauge fixture 330.

Similarly, the base plate 100 of the positioner assembly 325 is positioned with respect to a dimensional reference of the gauge fixture 330. The upper plate 102 of the positioner assembly 325 is referenced to the base plate 100 of the pusher assembly 320 with dowels 110. This registration or calibration is both repeatable and accurate. The sensor 106 of the positioner 325 is referenced to the upper plate 102 of the positioner assembly 325 with the holding bracket 112. Knowing the location of the base plate 100 of the positioner assembly 325 relative to a known reference of the gauge fixture 330, having the upper plate 102 doweled to the base plate 100, and having the sensor 106 calibrated to the upper plate 102, provides the location of the pusher sensor 206 relative to the known reference of the gauge fixture 330.

This allows the sensor 206, 106 or upper plate 202, 102 and modules of either the pusher assembly 320 or the positioner assembly 325, respectively, to be removed and/or replaced without requiring recalibration of the sensors 206, 106.

Figure 4:
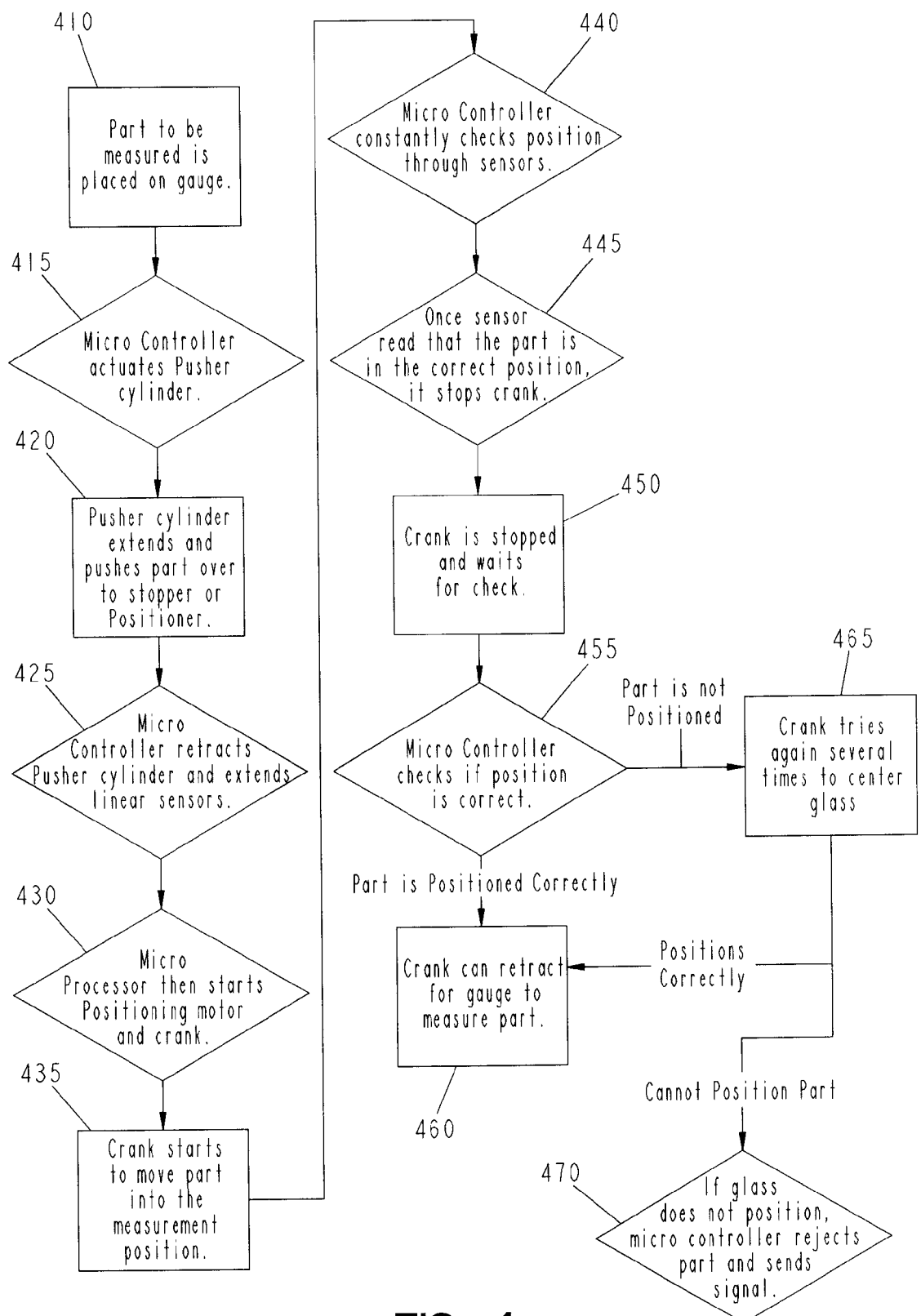
FIG. 4 shows a flow diagram of a typical positioning operation to prepare a part for measurement.

FIG. 4 provides a functional description of the steps followed by the positioning system in positioning a part 319 on a gauge 330. At step 410, the part 319 to be measured is placed on the gauge 330. At step 415, the micro-controller 315 actuates the pusher 320. At step 420, the pusher cylinder 204 extends the push tip 214 and pushes the part 319 until it reaches the stop 107 of the positioner 325. At step 425, the micro-controller 315 retracts the push tip 214 of the pusher cylinder 204 and extends the sensor tips 210, 114 of the pusher sensor 206 and the positioner sensor 106, respectively.

At step 430, the micro-controller 315 actuates the motor 108 connected to the crank 104 of the positioner assembly 325. At step 435, the crank 104 starts to move the part 319 into the measurement position. While the crank 104 moves the part 319 into the measurement position, at step 440, the micro-controller 315 constantly checks the position of the part 319 through the sensors 106, 206. When the sensors 106, 206 indicate that the part 319 is in the desired position, at step 445, the micro-controller 315 stops the crank 104. At step 450, the crank 104 is stopped and waits for the position of the part 319 to be checked.

At step 455, the micro-controller 315 checks if the part 319 is in the correct position. If the part 319 is positioned correctly, control is transferred to step 460. At step 460, the micro-controller 315 actuates the motor 108 to retract the crank 104 for measurement of the workpiece 319 on the gauge fixture 330. If the part 319 is not positioned correctly, control is transferred to step 465.

At step 465, if the sensors 106, 206 indicate that the part 319 should be moved towards the pusher assembly 320, the micro-controller 315 actuates the crank 104 to position the part 319, otherwise, the micro-controller 315 restarts the positioning process at step 415 and actuates the pusher cylinder 204. If repositioning of the workpiece 319 is successful, control is transferred to step 460. After a user-specified number of unsuccessful attempts to reposition the part 319 control is transferred to step 470. At step 470, the micro-controller 315 rejects the part 319 and sends a signal or activates an indicator that the part 319 is rejected.

While a preferred embodiment of the invention is set forth above and shown in the drawings, those skilled in the art will recognize that various modifications can be made to the system disclosed in this application without departing from the spirit and scope of the invention as set forth in the claims attached hereto.

We claim:

1. A positioning method for moving a workpiece that was placed on a gauge fixture to a desired position on the gauge fixture using a closed loop system comprising the steps of:

biasing the workpiece in a first direction beyond the desired position to a first predetermined stop position, moving the workpiece in a second direction which is opposite to the first direction;

measuring the position of the workpiece to determine a current position;

checking the current position relative to the desired position;

if the current position matches the desired position, stopping the movement of the workpiece:

if the workpiece needs to be moved in the second direction to reach the desired position, repeating the moving, measuring and checking steps.

2. The positioning method of claim 1 wherein, if the workpiece is moved in the second direction beyond the desired position, repeating the positioning method starting with the biasing step, whereby the work piece is placed in the predetermined first stop position.

3. The positioning method of claim 2 wherein, if the positioning method is repeated more than a predetermined number of times, indicating that the workpiece is rejected.

4. A positioning system for moving a workpiece to a desired position, the positioning system comprising:

a gauge fixture having a first side and a second side, said first side being opposite said second side;

a positioner assembly mounted on said first side of said gauge fixture, said positioner assembly including a stop member, a crank and a positioner sensor;

a pusher assembly mounted on said second side of said gauge fixture, said pusher assembly including a pusher member and a pusher sensor;

a controller connected to said pusher assembly and said positioner assembly;

wherein said pusher member of said pusher assembly pushes the workpiece until it reaches said stop member of said positioner assembly; said controller actuates said positioner sensor and said pusher sensor to sense the position of the workpiece on said gauge fixture and said controller actuates said crank of said positioner assembly to move the workpiece until said positioner sensor and said pusher sensor indicate that the workpiece is in the desired position.

5. The positioning system of claim 4, wherein:

said gauge fixture includes a gauge fixture reference position; said positioner assembly further includes a positioner plate having a positioner reference position, and said pusher assembly further includes a pusher plate having a pusher reference position;

said positioner plate being mounted on said gauge fixture at a first known location relative to said gauge fixture reference position; said positioner sensor being detachably mounted to said positioner plate at a known location relative to said positioner reference position; said positioner sensor being detachable and replaceable such that, when said positioner sensor is mounted on said positioner plate, said mounted positioner sensor is located at said known location relative to said positioner reference position; and said pusher plate being mounted on said gauge fixture at a second known location relative to said gauge fixture reference position; said pusher sensor being detachably mounted to said pusher plate at a known location relative to said pusher reference position; said pusher sensor being detachable and replaceable such that, when said pusher sensor is mounted on said pusher plate, said mounted pusher sensor is located at said known location relative to said pusher reference position;

whereby the location of both said mounted pusher sensor and said mounted positioner sensor relative to said gauge fixture reference position is known.

6. The positioning system of claim 4, wherein:

said gauge fixture includes a gauge fixture reference position;

said positioner assembly further includes a positioner base plate having a positioner base plate reference position, and a positioner upper plate having a positioner upper plate reference position;

said pusher assembly further includes a pusher base plate having a pusher base plate reference position, and a pusher upper plate having a pusher upper plate reference position;

said positioner base plate being mounted on said gauge fixture at a first known location relative to said gauge fixture reference position;

said positioner upper plate being detachably mounted to said positioner base plate at a known location relative to said positioner base plate reference position; said positioner upper plate being detachable and replaceable such that, when said positioner upper plate is mounted on said positioner base plate, said mounted positioner upper plate is located at said known location relative to said positioner base plate reference position; and said positioner sensor being detachably mounted to said positioner upper plate at a known location relative to said positioner upper plate reference position; said positioner sensor being detachable and replaceable such that, when said positioner sensor is mounted on said positioner upper plate, said mounted positioner sensor is located at said known location relative to said positioner upper plate reference position; and said pusher base plate being mounted on said gauge fixture at a second known location relative to said gauge fixture reference position;

said pusher upper plate being detachably mounted to said pusher base plate at a known location relative to said pusher base plate reference position; said pusher upper plate being detachable and replaceable such that, when said pusher upper plate is mounted on said pusher base plate, said mounted pusher upper plate is located at said known location relative to said pusher base plate reference position; and said pusher sensor being detachably mounted to said pusher upper plate at a known location relative to said pusher upper plate reference position; said pusher sensor being detachable and replaceable such that, when said pusher sensor is mounted on said pusher upper plate, said mounted pusher sensor is located at said known location relative to said pusher upper plate reference position;

whereby the location of both said mounted pusher sensor and said mounted positioner sensor relative to said gauge fixture reference position is known.

7. The positioning system of claim 6, wherein said positioner base plate and said pusher base plate are each permanently attached to said gauge fixture.

8. The positioning system of claim 6, further comprising a plurality of dowels, at least one of said plurality of dowels being used to attach said positioner upper plate to said positioner base plate, and at least one other of said plurality of dowels being used to attach said pusher upper plate to said pusher base plate.

9. The positioning system of claim 6, wherein said stop member and said crank are mounted on said positioner upper plate.

10. The positioning system of claim 6, wherein said pusher member is mounted on said pusher upper plate.

11. The positioning system of claim 4, wherein said positioner assembly further includes a motor connected to said crank, whereby said controller actuates said crank using said motor.

12. The positioning system of claim 4, wherein said crank includes a roller bearing, said roller bearing providing smooth contact between said crank and the workpiece being moved.

13. The positioning system of claim 4, wherein said controller includes a display which indicates the position of the workpiece on said gauge fixture sensed by said positioner sensor and said pusher sensor.

14. The positioning system of claim 4, wherein said controller includes a memory device which logs the readings of said positioner sensor and said pusher sensor during the positioning process.

15. A positioning system for moving a workpiece to a desired position, said positioning system comprising:
- a gauge fixture having a first side and a second side, said first side being opposite said second side;
- a positioner assembly mounted on said first side of said gauge fixture, said positioner assembly including a stop member, a crank and a first sensor;
- a sensing assembly mounted on said second side of said gauge fixture, said sensing assembly including a second sensor;
- a controller connected to said sensing assembly and said positioner assembly;
- wherein the workpiece is placed against said stop member of said positioner assembly; said controller actuates said first sensor and said second sensor to sense the position of the workpiece on said gauge fixture and said controller actuates said crank of said positioner assembly to move the workpiece until said first sensor and said second sensor indicate that the workpiece is in the desired position.

16. The positioning system of claim 15, wherein:
said gauge fixture includes a gauge fixture reference position;
said positioner assembly further includes a positioner base plate having a positioner base plate reference position, and a positioner upper plate having a positioner upper plate reference position;
said sensing assembly further includes a sensing base plate having a sensing base plate reference position, and a sensing upper plate having a sensing upper plate reference position;
said positioner base plate being mounted on said gauge fixture at a first known location relative to said gauge fixture reference position;
said positioner upper plate being detachably mounted to said positioner base plate at a known location relative to said positioner base plate reference position; said positioner upper plate being detachable and replaceable such that, when said positioner upper plate is mounted on said positioner base plate, said mounted positioner upper plate is located at said known location relative to said positioner base plate reference position; and
said first sensor being detachably mounted to said positioner upper plate at a known location relative to said positioner upper plate reference position; said first sensor being detachable and replaceable such that, when said first sensor is mounted on said positioner upper plate, said mounted first sensor is located at said known location relative to said positioner upper plate reference position; and
said sensing base plate being mounted on said gauge fixture at a second known location relative to said gauge fixture reference position;
said sensing upper plate being detachably mounted to said sensing base plate at a known location relative to said sensing base plate reference position; said sensing upper plate being detachable and replaceable such that, when said sensing upper plate is mounted on said sensing base plate, said mounted sensing upper plate is located at said known location relative to said sensing base plate reference position; and
said second sensor being detachably mounted to said sensing upper plate at a known location relative to said sensing upper plate reference position; said second sensor being detachable and replaceable such that, when said second sensor is mounted on said sensing upper plate, said mounted second sensor is located at said known location relative to said sensing upper plate reference position;
whereby the location of both said mounted first sensor and said mounted second sensor relative to said gauge fixture reference position is known.

17. The positioning system of claim 16, wherein said positioner base plate and said sensing base plate are each permanently attached to said gauge fixture.

18. The positioning system of claim 16, further comprising a plurality of dowels, at least one of said plurality of dowels being used to attach said positioner upper plate to said positioner base plate, and at least one other of said plurality of dowels being used to attach said sensing upper plate to said sensing base plate.

19. The positioning system of claim 16, wherein said controller includes a display which indicates the position of the workpiece on said gauge fixture sensed by said first sensor and said second sensor.

* * * * *